United States Patent [19]

Brownlee

[11] 4,212,148
[45] Jul. 15, 1980

[54] AGRICULTURAL MACHINE

[76] Inventor: J. O. Brownlee, 14 S. Evers St., Plant City, Fla. 33566

[21] Appl. No.: 845,946

[22] Filed: Oct. 27, 1977

Related U.S. Application Data

[63] Continuation-in-part of Ser. No. 660,354, Feb. 23, 1976, abandoned.

[51] Int. Cl.$^2$ .................................................... A01D 46/00
[52] U.S. Cl. ...................................... 56/328 R; 56/329
[58] Field of Search ............... 56/328 R, 329, 328 TS, 56/330, 209; 171/133

[56] References Cited
U.S. PATENT DOCUMENTS

| | | | |
|---|---|---|---|
| 2,660,021 | 11/1953 | McDowell | 56/330 |
| 3,008,724 | 11/1961 | Lapins et al. | 56/209 |
| 3,507,101 | 4/1970 | Bernshausen | 56/328 R |
| 3,553,949 | 1/1971 | Rauth | 56/329 |
| 3,596,455 | 8/1971 | Adrian | 56/329 |
| 3,635,004 | 1/1972 | Webb et al. | 56/328 TS |
| 3,912,016 | 10/1975 | Arnold | 171/133 |
| 3,943,688 | 3/1976 | Billings | 56/328 R |

Primary Examiner—Jay N. Eskovitz
Attorney, Agent, or Firm—Duckworth, Hobby, Allen & Pettis

[57] ABSTRACT

A multiple purpose machine for cultivating and harvesting fruit bearing trees having a construction suitable for straddling a row of trees and performing various operations on the trees enclosed therein while continuously moving along a tree row. The agriculture machine is so designed to perform the operations of insecticide and fertilizer spraying, trimming, abscission spraying and harvesting. The fruit harvesting machine comprises an enclosure having two side portions disposed in surrounding relationship to the tree. In the interior of the enclosure, two oppositely disposed rows of fans are offset relative to the tree on either side of the tree so that the air blasts coming from the fan creates a whipping effect around the tree. Interrupting the air blast are vanes which are disposed in a varying angle relative to the air blast to create an oscillating effect on the tree. Hydraulic extenders are connected to the wheels allowing the machine to level its base. Further attachments connected to the interior of the enclosure include sprayers, trimmers and a fruit transportation system.

22 Claims, 6 Drawing Figures

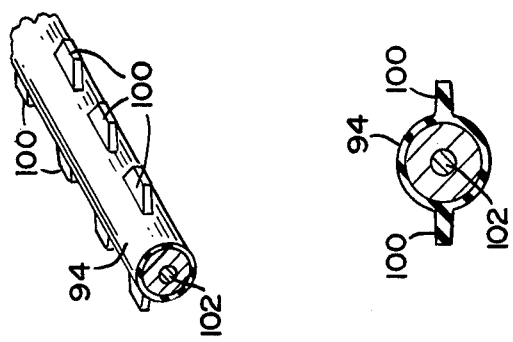
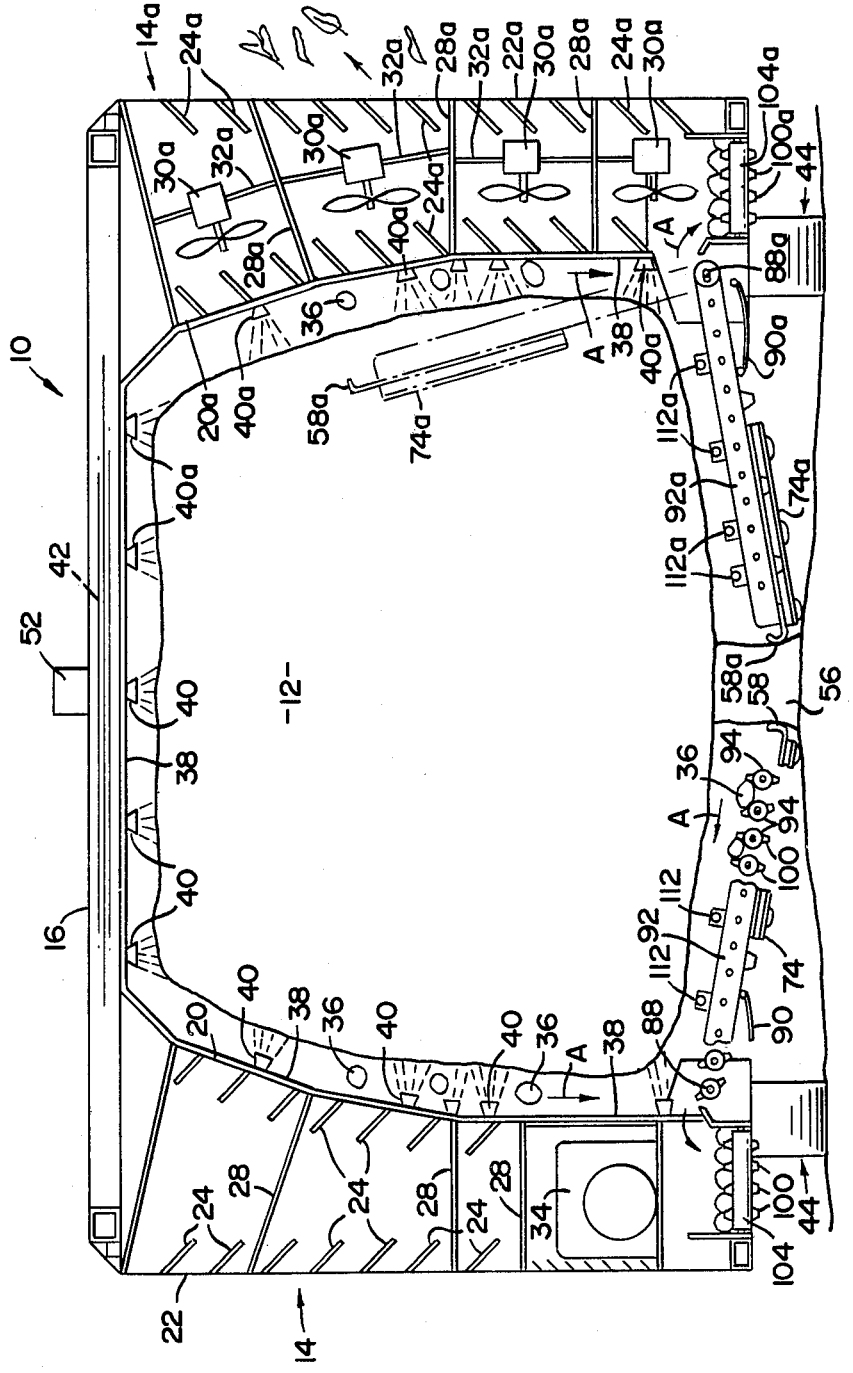

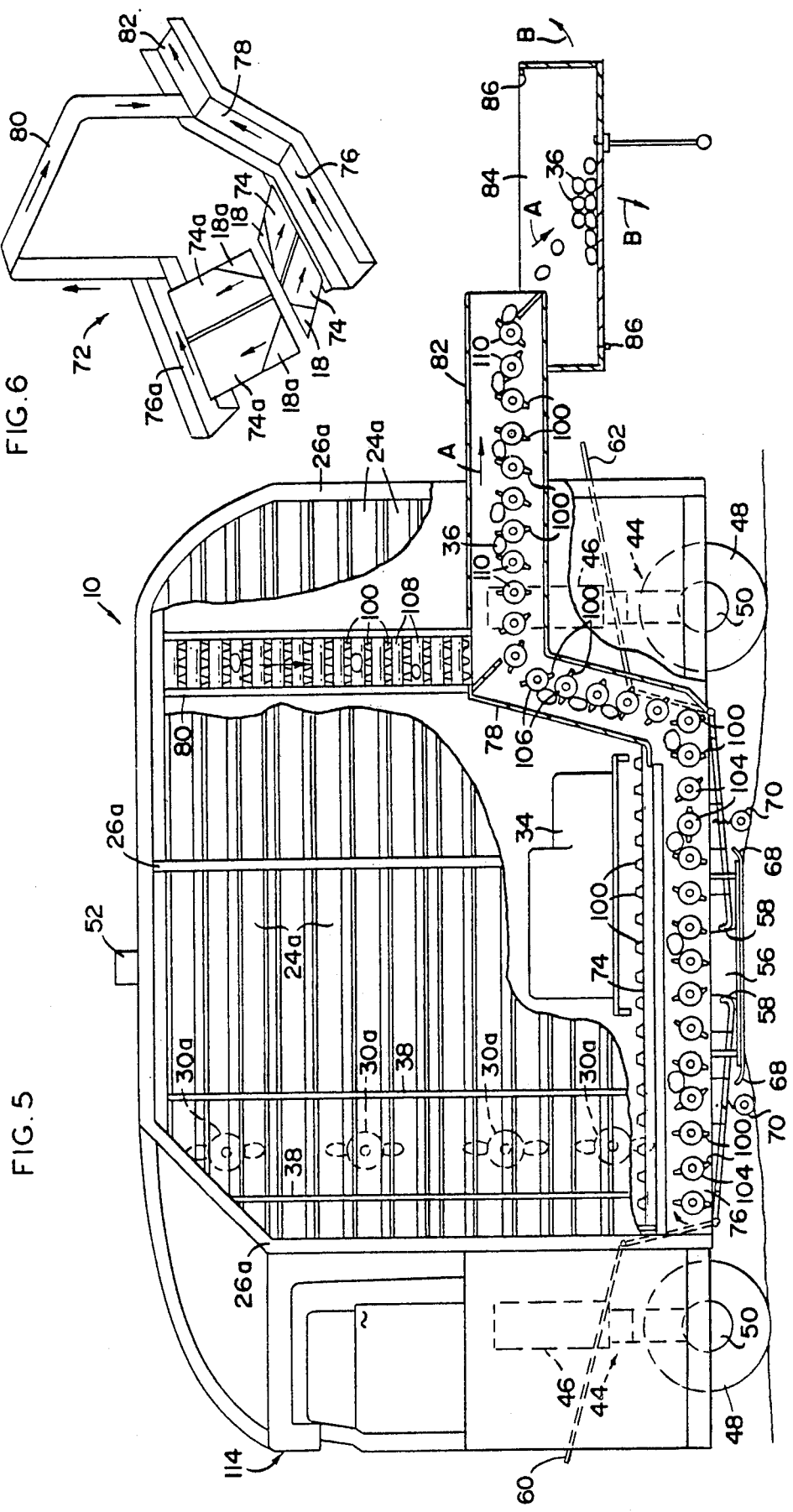

AGRICULTURAL MACHINE

This is a continuation-in-part of my prior application Ser. No. 660,354, filed Feb. 23, 1976, now abandoned.

BACKGROUND OF THE INVENTION

1. Field of the Invention

A multiple purpose agricultural machine for cultivating and harvesting fruit bearing trees comprising fan means, spray means, trimmer means, and collection means attached to a mobile enclosure.

2. Description of the Prior Art

This invention relates generally to multiple purpose agricultural machines for cultivating and harvesting fruit bearing trees.

One of the most commonly encountered problems in harvesting fruit from fruit bearing trees is the removal of the fruit from its stem. Some of the first methods of mechanically harvesting the fruit included the clamping of the trunk of a fruit bearing tree and shaking it until the fruit fell off. This practice evolved a step further by the design of clamps adapted for use on branches and limbs. These methods were found to be unsatisfactory due to being time consuming, causing damage to the tree and fruit and the incomplete removal of the fruit. Another development in this area included the use of high velocity air blasts to disengage the fruit from the trees. These prior machines generally operated by directing the high velocity blast of air against the side of the tree whereby the momentum of the air penetrates throughout the foliage and impacts with the fruit with sufficient force to cause the fruit to snap from its limb. High velocity blasts of air were found to result in severe damages to the leaves of the tree. In an attempt to make the air blasting apparatus more effective, air ducts were designed so that the air blast would be blown upwardly, laterally and downwardly upon the tree. This type of apparatus has been found to induce a slight amount of oscillation of the limbs to aid in the removal of the fruit. As the limb is deflected upward by high velocity blasts of air, the inertia of the fruit tends to sever the stems of the fruit from the limb.

Other problem areas in this agricultural area are directed to the harvesting and cultivating of fruit bearing trees. To overcome such problems the designing of an apparatus that can enclose the fruit tree and perform functions thereon has been suggested in the prior art. Such prior art devices which do enclose the fruit bearing trees would require such dimensions that their transportation between groves on conventional roads could be considered generally impractical.

Another commonly encountered problem in the use of mechanical harvesters is that the trees are often on hillsides, or situated on other than level terrain. Therefore, a harvester travelling down a row, for example, might have its wheels on one side disposed substantially lower than the wheels on the other side. If the harvester is tilted, the branches of the tree would strike the side of the interior walls of the harvester so that it is either inoperable or requires substantially wider dimensions. Therefore, there exists a need for a harvester that can properly level itself on a horizontal and vertical basis.

A harvester which travels the row of trees and operates while continuously moving down the row of trees, encounters the problem of trying to center itself since in a normal row of trees quite often the trees are offset relative to the centerline of the row. Ideally, this requires a preferred harvester to have the ability to change its disposition laterally relative to the centerline in a random manner, dependent on the placement of the next tree. At present a number of the devices shown in the prior art can accomplish this only by manual operation.

Representative prior art devices are shown in the following U.S. Pat. Nos. McDowell 2,660,021; Lapins, et al 3,008,724; Webb, et al 3,635,004; Billings 3,943,688.

SUMMARY OF THE INVENTION

This invention relates to a multiple purpose agricultural machine for harvesting and cultivating fruit bearing trees. More specifically, the machine comprises an enclosure with two oppositely disposed side portions between which a tree can be at least partially surrounded. The machine is constructed to straddle a row of trees and perform numerous operations on the individual trees therein as the machine continuously moves along the row. While not limited to the following functions, the machine is equipped for insecticide and fertilizer spraying, trimming, harvesting, and the application of an abscission spray.

For harvesting, there are two vertical rows of fans, one disposed in each side portion with the alignment of each row relative to the other being offset. This allows the air blast to be directed by each row of fans to opposite sides of the tree but at the same time the air blasts are offset sufficiently so that they do not converge. This creates a whipping effect of the air flow around the tree and increases the effectiveness of the air flow over those devices disclosed in the prior art which merely direct the air blast to one side or both sides of the trees without offsetting the oppositely directed blasts.

It is well known in the prior art that oscillating the branches will improve the effectiveness in which fruit is removed from their stems. To accomplish this end, the present invention has a novel method using vanes which interrupt the air blasts so as to direct it upwardly, laterally, and downwardly upon the tree. These vanes are attached in horizontally spaced apart disposition relative to each other on the interior and exterior side of each side portion. Those attached to the interior side of each side portion are adjustable so that their angle relative to the air blasts can be changed. The ones located on the exterior wall of the side portions are angled upward to prevent the fruit from passing out of the enclosure but at the same time allowing the air to flow in and out thereof.

Another important feature of the subject invention includes wheel supports that can be extended or withdrawn by an hydraulic or electrical motor system. The wheel supports comprise a plurality of extender members of the hydraulic type with each connected to one end of the side portion and the other end connected to wheel members. Since groves of fruit trees are often located on hillsides, one wheel member may be disposed lower than the corresponding wheel member on the other side portion. To compensate for this and to level the base of the enclosure each wheel member can be individually extended. In the preferred embodiment there are four wheel members, each of which can be individually extended and withdrawn so as to level all four corners of the enclosure relative to each other. This prevents the branches of the tree from bumping the interior of the enclosure. In another embodiment of the present invention, this levelling can be accomplished automatically by the use of an auto-gyro sensing and signalling device which continuously adjusts each of the four wheel members so as to keep the base of the enclosure level.

The problem encountered with trees in a row being offset from a centerline formed down the row and therefore requiring the side displacement of the machine is overcome by a guide system which comprises a plurality of sensor arms with sensor wheels attached to one end and the other end pivotally connected to the side portions. Upon the tree trunk being displaced from the center of the enclosure, the sensor arms will send a signal to change the alignment of the sensor wheels so as to result in a generally sideways or lateral movement of the machine.

In operation, the agricultural machine will be used to spray insecticide and fertilizer upon the trees. This is accomplished by a spray system comprising a tank and a pipe including spray nozzles formed therein connected to the tank. The pipe is attached to the floor portion and to the interior walls of the enclosure. This spray system is also utilized in the application of an abscission agent which facilitates the removal of fruit from its stem. This abscission agent is applied to the tree some three or four days before harvesting. Normally, for example, with citrus trees there are two crops of fruit on the tree, one being young and the other being ripe and ready to be harvested. The application of the abscission agent is ineffective as to the young fruit but loosens the ripe fruit from its stem, making its removal by the air blasts easier.

The interior walls of the enclosure are equipped with a trimmer normally comprising rotary cutters that extend outwardly from the walls to shape the trees to a proper, predetermined shape for subsequent harvesting operations. The shape of the tree, which is determined by the disposition of the cutters, can fairly closely correspond to the interior shape of the enclosure. This is made possible by the balancing of the base of the enclosure so that the harvester will always be properly aligned with the tree. Therefore, the harvester will be in the same position relative to the tree during its cutting and trimming operation as well as during its harvesting operation. This levelling function of the harvester provides proper alignment to be repeatedly accomplished where the ground is sloped such as on a hillside. As the harvester moves along the row it will be continuously adjusting its base so as to remain level and therefore each tree can be approached so that the tree's predetermined shape formed by the trimmers will fit within the confines of the enclosure.

At the time of the harvesting, the fruit has already been sprayed with the abscission agent so that it may readily be removed from the tree. As the machine encounters the trunk of the tree, the guide system will align the center of the machine with the center of the tree. The fans will then direct the blast of air against the oppositely disposed sides of the tree so as to create a whipping action around the tree. The fruit having been already loosened somewhat from their stems by the abscission agent will be detached from the tree and fall to the bottom of the enclosure. At the bottom of the enclosure is a liner and fruit transportation system which catches the falling fruit. Ramps are disposed in substantially parallel relation to the liner and transport the fruit to a second set of ramps which in turn transports the fruit to a container travelling behind the harvester.

While a more detailed description of a preferred embodiment of the invention will be given hereinafter, certain attributes of the agricultural machine should be noted at this point. First, the machine of this invention represents a significant departure from state-of-the-art harvesting devices--particularly those currently utilized in the citrus industry. One perceived corollary to the use of this invention will be standardized, smaller trees. So that the machine can travel roads and highways, it is constructed so as to accommodate trees no greater than about 12 feet in height and about nine or ten feet in diameter. Because of their smaller sizes, the trees can actually be planted more closely together. In actual field tests with citrus trees this has proved to be quite desirable.

Because of the trees' smaller sizes the application of fertilizers, insecticides and abscission sprays is more economical and efficacious. Furthermore, sunlight can better reach each fruit formed on the trees. This results in more even ripening of all fruit and standardizes the quality of individual fruits, regardless of their location on the tree. Because the trees are smaller and can be planted more closely together, and because a higher percentage of high quality fruit is obtained from each tree, the per acre yield of sugar solids (the standard by which citrus quality and value are measured) is actually increased. This increase in quality and value is directly attributable to use of the agricultural machine of this invention.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a rear, sectional view of the agricultural machine.

FIG. 2 is a fragmentary detail of the conveyor roller means of the agricultural machine.

FIG. 3 is a transverse sectional view of the conveyor roller means illustrated in FIG. 2.

FIG. 5 is a partially cutaway side view of the agricultural machine.

FIG. 6 is a schematic representation of the collection means of the agricultural machine.

Similar reference characters refer to similar parts throughout the several views of the drawings.

DETAILED DESCRIPTION

Figure 4:
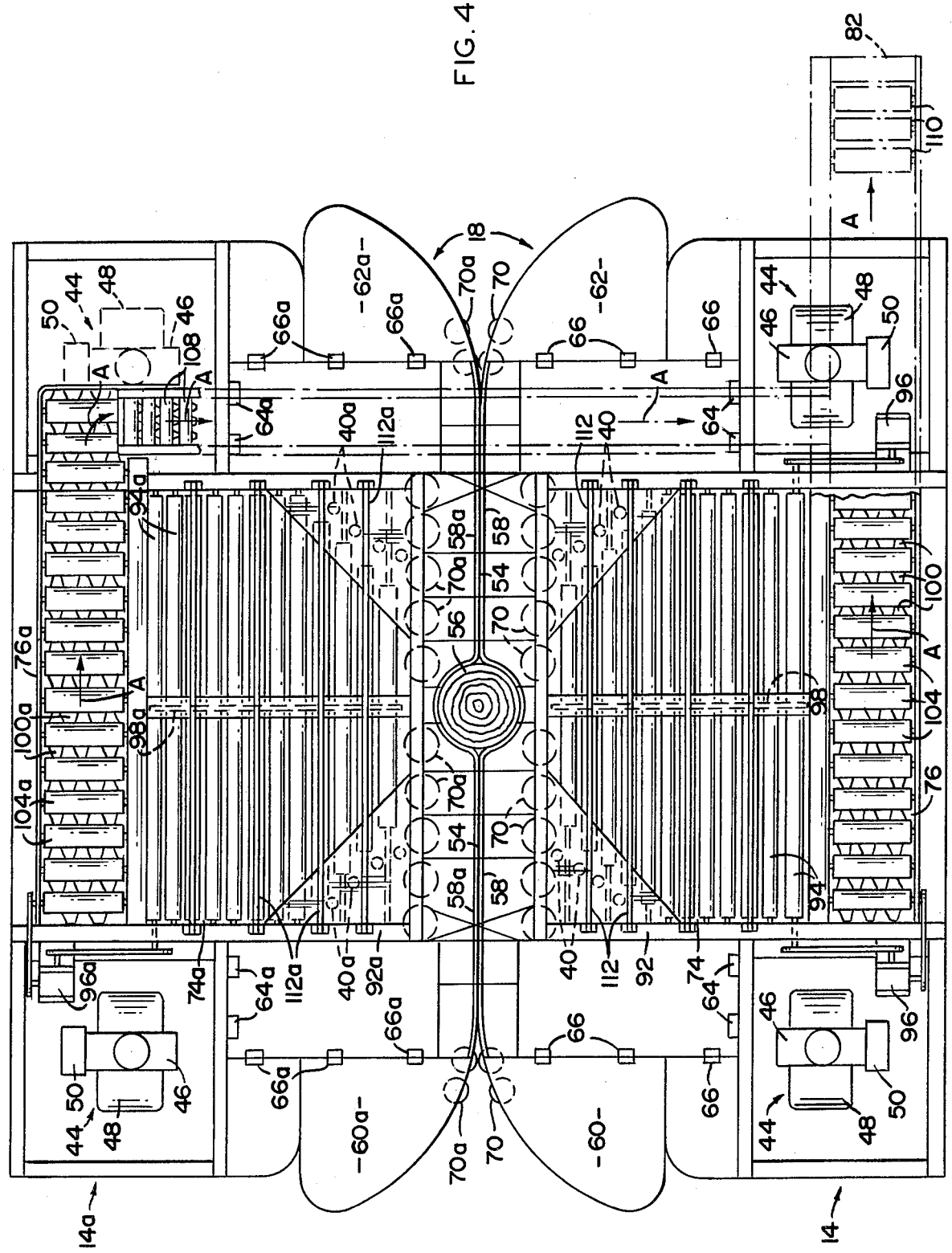
FIG. 4 is a cutaway top view of the bottom of the agricultural machine.

This invention relates to an agricultural machine for cultivating and harvesting fruit bearing trees comprising enclosure means, generally indicated as 10, shaped and disposed for placement in surrounding relationship to the fruit bearing tree 12. The enclosure means 10 includes, as best seen in the view of FIG. 1, first and second side portions 14 and 14a, respectively. At this point it should be noted that numerous structural elements in the agricultural machine are correspondingly disposed on opposite sides of the enclosure means 10. These corresponding, but oppositely disposed, structural elements will be indicated in this detailed description by the use of a lower case letter "a" to designate those parts found on the right-hand side of the machine with regard to the normal direction of travel. First side portion 14 and second side portion 14a are disposed in spaced apart relationship to each other and are interconnected across the top by frame members 16. As will be discussed in greater detail below, first side portion 14 and second side portion 14a are interconnected with one another across the bottom by bottom liner means generally indicated as 18 in the view of FIG. 4.

First side portion 14 comprises an inner wall 20 and an outer wall 22. Both inner wall 20 and outer wall 22 comprise a plurality of vertically spaced apart side vane means 24 extending the horizontal length of side portion 14. Side vane means 24 of inner wall 20 can be rotated around their longitudinal axis, whereas vane means 24 of outer wall 22 are fixed in a locked position so that the cross sectional axis of vane means 24 attached to outer wall 22 is tilted at about a 45° angle relative to the horizontal. This positioning of side vanes 24 for outer wall 22 results in fruit being directed downwardly so as not to leave the machine, but yet allows the air to flow through enclosure means 10 substantially without restriction. As best seen in the view of FIG. 5, supporting the side vane means 24 and attached thereto are vertically disposed frame bar means 26. The spaced apart inner and outer walls 20 and 22 are maintained in substantially adjacent position by a plurality of interconnecting bar means 28. Corresponding structural parts on second side portion 14a are identified by the use of the letter "a" in combination with the appropriate reference numeral.

Still with regard to the view of FIG. 1, a plurality of fan means 30a are vertically disposed in a row formation between inner wall 20a and outer wall 22a. Of course, corresponding fan means 30 are placed on first side portion 14, but do not show in the view of FIG. 1. Each fan means 30a is further disposed between adjacent spaced apart interconnecting bar means 28a and attached thereto by fan support bar means 32a. Two such fan support bar means 32a are required to attach each fan means 30a. As shown in the view of FIG. 1, fan support bar means 32a are attached to oppositely disposed sides of fan means 30a with the oppositely disposed end of each of the fan support bar means 32a connected to the appropriate interconnecting bar means 28a. A second row of fan means 30 are disposed within first side portion 14 in a corresponding vertical row, but fan means 30 are offset laterally with regard to fan means 30a. This staggering position of the oppositely disposed rows of fan means 30 and 30a creates a fluid flow across tree 12 so that the opposing air flows do not converge. This necessarily results in a whipping effect of the air as it flows around tree 12. It should also be noted that a power source 34 is provided within first side portion 14. Power source 34 is utilized to drive not only fan means 30 but the remaining attachments included in the present invention and discussed more fully below. Of course, a corresponding power source 34a is provided within second side portion 14a.

The side vane means 24 and 24a that are positioned along inner walls 20 and 20a, respectively, are rotatable around one of their horizontal edges, allowing the air flow coming from fan means 30 and 30a to oscillate. In this manner the air can be directed upwardly, laterally and downwardly in order keep the direction of the stream of air constantly changing in order to minimize the time that the air blast is impending directly upon any one leaf. This is effective not only in preventing damage to the tree leaves, but also will result in oscillation of the limbs. This induced oscillation will actually aid in the removal of fruit 36 from the limbs. By constantly oscillating the flow of fluid, it has been found that fruit may be removed without having to resort to higher air velocities when there is no oscillation of the fluid stream.

A preferred embodiment for the spray means of the present invention is also illustrated in the view of FIG. 1 as comprising pipe means 38 having spray nozzles 40 and 40a operatively attached thereto. Additional spray nozzles 40 and 40a may also be provided along the bottom of enclosure means 10 as indicated in phantom in the view of FIG. 4. Fluid is supplied to pipe means 38 from a tank means 42 which is preferrably disposed within one of the frame members 16. It is, of course, to be understood that tank means 42 could be located in alternative positions so long as tank means 42 was in fluid communication with pipe means 38. As stated hereinabove, the fluid in tank means 42 may comprise fungicide, insecticide, fertilizer or abscission material.

Two additional factors concerning the spray means of the present invention should also be noted. First, it should be noted that spray nozzles 40 and 40a are positioned relatively downstream from the fluid flow created by fan means 30 and 30a. This placement has been determined to increase the efficacy of the application of the spray material. Second, it may be desirable to utilize spray nozzles 40 and 40a comprising atomizer spray heads dependent upon the type of material being sprayed.

A plurality of wheel support means, generally indicated as 44, and preferably four in number are utilized in the agricultural machine of the present invention. In the preferred embodiment, as shown in the view of FIG. 4, wheel support means 44 are oppositely disposed on the ends of each side portion 14 and 14a. As shown in the view of FIG. 5, wheel support means 44 comprise an hydraulically powered extender member 46 and a wheel member 48 connected thereto. Each wheel member 48 can be hydraulically adjusted relative to the level or contour of the ground over which it travels by the use of extender members 46. However, this adjustment of wheel support means 44 can also be accomplished by electrical motors, and this invention is not intended to be limited to an hydraulic system. The preferable arrangement of the mechanism to provide the power for the wheels would be a self-propelling motor within each wheel support means 44 as indicated at 50. Accordingly, the specific contour of the ground travelled by the agricultural machine and the location of trees thereon makes little difference in that the machine is essentially self-levelling through the interaction of the four independently operated wheel support means 44. It should also be noted that, in the preferred embodiment of the invention, the hydraulic or electrical wheel support means 44 can be manually controlled by the operator or automatically controlled by an auto-gyro 52 of the damp pendulum type. The auto-gyro 52 in response to contour changes as the machine travels across the ground will generate signals to properly extend or contract the appropriate extender member 46 as required to maintain the machine in a substantially level position. It is therefor necessary that auto-gyro 52 be electrically connected to each of the wheel support means 44. In this embodiment auto-gyro 52 is electrically connected to each wheel support means 44 through a corresponding one of the extender members 46. Individual extender members 46 are extended or contracted in response to net "+" or "−" signals from auto-gyro 52 so as to maintain the machine in a substantially level position resulting in a net "0" signal from auto-gyro 52.

As previously stated, extending between the lower extremities of first side portion 14 and second side portion 14a and forming a bottom therebetween is bottom liner means 18. As fruit 36 is removed from tree 12, some of that fruit will necessarily fall on bottom liner means 18. As will be explained in greater detail below, bottom liner means 18 is configured so as to direct fruit 36 falling thereon to the collection means of the present invention. As best seen in the view of FIG. 4, a parting middle portion 54 is provided in bottom liner means 18 so as to allow tree trunk 56 to pass down the middle of bottom liner means 18. This parting middle portion 54 further comprises thickened liner portions 58 and 58a, associated with first side portion 14 and second side portion 14a, respectively. Thickened liner portions 58 and 58a are provided so as to preclude, to as great an extent as possible, the creation of gaps around tree trunk 56 because of uneven terrain. This effect can best be seen in the view of FIG. 1.

Still with particular regard to the view of FIG. 4, it can be seen that the forward and aft portions 60 and 60a and 62 and 62a, respectively, of bottom liner means 18 meet in a V-shaped configuration so as to facilitate the bending of thickened liner portions 58 and 58a upon contact with tree trunk 56. Furthermore, after trunk 56 passes, forward portions 60 and 60a, and then aft portions 62 and 62a, fold back closing any gap to prevent fruit 36 from falling out of enclosure means 10. Bottom liner means 18 is connected to first and second side portions 14 and 14a as by hinges 64 and 64a. Second hinges 66 and 66a are disposed within bottom liner means 18 so as to allow flexing and movement of bottom liner means 18. As best seen in the view of FIG. 5, a plurality of skid means 68 are attached to bottom liner means 18 so as to facilitate its movement across the ground. Finally, a plurality of sensor wheel means 70 and 70a are operatively disposed on bottom liner means 18 so as to engage tree trunk 56 as it passes through middle portion 54. These sensor wheel means 70 and 70a are electrically connected to wheel support means 44 so as to control their orientation to insure that enclosure means 10 is properly centered around trunk 56 and tree 12. The electrical connection between sensor wheels 70 and 70a to wheel support means 44 is preferably made through the individual motors 50. Signals generated by sensor wheels 70 and 70a are utilized to selectively stop and start individual motors 50 so as to maintain enclosure means 10 in a substantially centered relation around trunk 56 automatically.

Reference is now invited to the schematic view of FIG. 6 wherein the collection means of the present invention is generally indicated as 72. While the precise construction and operation of collection means 72 will be presented below, at this point it should be noted that collection means 72 comprises a pair of first ramp means 74 and 74a, a pair of second ramp means 76 and 76a, and third ramp means comprising elevator ramp 78, crossover ramp 80, and delivery ramp 82. The arrows in the schematic view of FIG. 6 represent the path of fruit travel as it exits the agricultural machine. As shown in the view of FIG. 6, fruit 36 is ultimately delivered by delivery ramp 82 to a storage container means 84. Arrows A in the views of FIGS. 1, 4 and 5 indicate the path of travel by fruit 36. Arrows B in the view of FIG. 5 illustrate two methods for emptying, or dumping, fruit 36 from container means 84. These alternate methods of emptying are accomplished by providing container means 84 with hinges 86 as indicated.

As best seen in the view of FIG. 1, first ramp means 74 and 74a are pivotally attached to corresponding first side portions 14 and 14a as indicated at 88 and 88a, respectively. This allows first ramp means 74 and 74a to pivot upwardly as indicated in phantom in the view of FIG. 1 when it is desired to transport the agricultural machine along a roadway. It should also be noted that portions of liner means 18 adjacent first ramp means 74 and 74a also pivot by virtue of their hinges 64 and 64a. The pivotal connection illustrated at 88 and 88a is accomplished by means of a pin attached to side portion 14 and 14a and a corresponding slot formed in first ramp means 74 and 74a. By virtue of this pin and slot arrangement, first ramp means 74 and 74a may flex transversely with respect to side portions 14 and 14a so as to prevent damage to the machine upon bumping a tree trunk. First ramp means 74 and 74a are normally fully extended toward trunk 56 and lateral motion of first ramp means 74 and 74a is regulated and dampened as by shock absorbers or springs 90 and 90a.

The preferred construction of first ramp means 74 and 74a is best seen in the views of FIGS. 1 and 4, to which attention is now invited. As shown therein, first ramp means 74 and 74a comprise a pair of first ramp frames 92 and 92a on which are mounted a plurality of first conveyor roller means 94 and 94a. These first conveyor roller means 94 and 94a are of varying longitudinal dimension, the shortest being adjacent the center line of enclosure means 10 and the longest being adjacent first side portion 14 and second side portion 14a, all as illustrated in the view of FIG. 4. Furthermore, as best seen in the view of FIG. 4, first conveyor roller means 94 and 94a are driven by a motor means 96 and 96a disposed in driving relation to the outermost one of first conveyor roller means 94 and 94a. The power for motor means 96 and 96a is translated to the remaining first conveyor roller means 94 and 94a by drive means 98 and 98a which may comprise a sprocket and chain or a belt and pulley arrangement. It should of course be obvious that all of the first conveyor roller means 94 are rotated in the same direction so as to transfer fruit 36 as indicated by arrows A. First conveyor roller means 94a also rotate in the same direction, but opposite that of first conveyor roller means 94.

A preferred embodiment for the construction of first roller means 94 and 94a is illustrated in the detail views of FIGS. 2 and 3. As shown therein, a plurality of radially extending finger means 100 are disposed in spaced apart relation to each other on the outer surface of roller means 94. The longitudinal spacing between adjacent finger means 100 is such that they will intermesh with corresponding finger means 100 disposed on the next adjacent roller means 94. Furthermore, as illustrated in the view of FIG. 3, it is preferred to form two rows of finger means 100 along each roller means 94, said rows being spaced at a 180° interval with respect to the axis of rotation 102.

In the preferred embodiment of the agricultural machine, second ramp means 76 and 76a as well as elevator ramp 78, cross-over ramp 80 and delivery ramp 82 are all constructed in similar fashion to first ramp means 74 and 74a. That is to say, second ramp means 76 and 76a includes second conveyor roller means 104 and 104a. Elevator ramp 78 comprises elevator roller means 106, cross-over ramp 80 includes cross-over roller means 108, and delivery ramp 82 comprises delivery roller means 110. Each of these roller means include finger means 100 formed thereon as described above.

While the above description has been given with regard to a preferred embodiment for the construction of the correction means of the present invention, it is to be understood that the scope of the invention is not limited thereto. For example, it is contemplated that alternative conveyor systems might be utilized in place of the specific roller means disclosed herein. The present invention is specifically intended to cover such alternative constructions for conveying and collecting the fruit. The preferred construction has been chosen for the reason that by virtue of the spacing between adjacent ones of the roller means trash, leaves, and too small fruit will fall through first ramp means 74 and 74a, thereby resulting in ultimate collection of only fruit of a predetermined size. Furthermore, the fruit will not be contaminated by leaves, branches, etc. To accomplish this result, enclosure means 10 is open to the ground over the area defined by first ramp means 74 and 74a.

It is, of course, possible that relatively large limbs may be broken away from the trees as fruit is collected therefrom. These large limbs could injure the first conveyor roller means 94 and 94a if they were allowed to fall therethrough. Accordingly, to prevent such jamming of first ramp means 74 and 74a, the agricultural machine preferably further comprises a plurality of guard means comprising rods 112 and 112a attached to first ramp frames 92 and 92a as best seen in the view of FIG. 3. Rods 112 and 112a are positioned in substantially parallel relationship to first conveyor roller means 94 and 94a and are placed above those conveyor roller means so as to intercept large limbs or sticks.

Finally, it is of course contemplated that a cab such as that generally indicated by 114 in the view of FIG. 5 will be provided from which to operate and control the agricultural machine. By virtue of the relatively large size of enclosure means 10, it has been determined that it is preferable to place the cab 114 relatively close to the ground so as to maintain a low center of gravity.

A further comment should be made with regard to the operation of container means 84. Container means 84 is normally maintained in an open position so as to convey the fruit 36 directly to a following truck. In the citrus industry, the trucks utilized in the grove for collection and transportation of fruit are normally referred to as "goats." Of course, when the truck, or goat, was full and a new truck was being moved into position, container means 84 would be closed.

It will thus be seen that the objects made apparent from the preceeding description are efficiently attained, and since certain changes may be made in construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

Now that the invention has been described, what is claimed is:

1. An agricultural machine for cultivating and harvesting fruit bearing trees, said agricultural machine comprising: enclosure means shaped and dimensioned for disposition in substantially surrounding relationship to the fruit bearing tree; spray means attached to said enclosure means and disposed in fluid delivering relationship to the fruit bearing tree, whereby fluids may be applied to the fruit bearing tree; air blowing means comprising a plurality of fan means attached to said enclosure means and disposed in fluid communicating relationship to the fruit bearing tree; collection means attached to said enclosure means and disposed in receiving relationship to fruit removed from the fruit bearing tree; wheel support means attached to said enclosure means, whereby said agricultural machine may be transported along a predetermined path; and drive means operatively connected to said wheel support means in driving relation thereto; said enclosure means comprising first and second side portions disposed in spaced apart relationship to each other, and said first and second side portions each comprising inner and outer wall members, a plurality of side vane means disposed in substantially spaced apart relationship on said inner and outer wall members, said side vane means disposed within said inner wall members being adjustable with respect to a normal horizontal position whereby fluid from said spray means and said fan means may be oscillated, said enclosure means further comprising bottom liner means disposed in substantially interconnecting relation between the bottom of said first side portion and the bottom of said second side portion; said collection means comprising a pair of first ramp means, each one of said pair being attached at one end thereof to a corresponding one of said first and said second side portions and the other end of each one of said pair being attached to said bottom liner means, whereby disengaged fruit falling on said bottom liner means is directed to one of said pair of first ramp means.

2. An agricultural machine as in claim 1 wherein said bottom liner means further comprises a parting, flexible middle portion centrally disposed therein and configured to receive the trunk of the tree as the tree is surrounded by said enclosure means.

3. An agricultural machine as in claim 2 wherein said bottom liner means further comprises flange means defining the length of said middle portion, whereby gaps are substantially eliminated even when said middle portion passes around a tree planted on uneven terrain.

4. An agricultural machine as in claim 2 wherein said bottom liner means further comprises skid means attached thereto and disposed to engage the ground.

5. An agricultural machine as in claim 1 wherein said spray means comprises tank means, a plurality of pipe means connected to said tank means, and a plurality of spray nozzle means operatively disposed on said pipe means.

6. An agricultural machine as in claim 5 wherein at least a portion of said plurality of spray nozzle means are disposed downstream of the fluid flow normally generated by said fan means.

7. An agricultural machine as in claim 5 wherein said plurality of spray nozzle means comprise atomizer spray heads.

8. An agricultural machine as in claim 1 further comprising trimmer means attached to said enclosure means and disposed in cutting relationship to the fruit bearing tree.

9. An agricultural machine as in claim 1 wherein said side vanes on said outer wall members are fixedly attached thereto and have a cross axis tilted at an upward angle relative to horizontal, whereby leaves can be discharged from said enclosure means but fruit remains therein.

10. An agricultural machine as in claim 1 wherein said side vanes disposed on said inner wall members are rotatably attached thereto along one of their horizontal edges, whereby the direction of fluid flow from said fan means may be varied.

11. An agricultural machine as in claim 1 wherein said plurality of fan means are arranged in two oppositely disposed rows, one of said rows being mounted on each said side portion, said oppositely disposed rows being offset relative to each other, whereby a whipping effect of the fluid flow from said fan means is created around the tree within said enclosure means.

12. An agricultural machine as in claim 1 wherein said wheel support means comprises a plurality of wheel members and a corresponding plurality of extender members, one end of each of said extender members being attached to one of said first and second side portions and the other end of each of said extender members being attached to a corresponding one of said wheel members, whereby the vertical disposition of each of said wheel members may be adjusted relative to the others so as to maintain said machine in a substantially level orientation.

13. An agricultural machine as in claim 1 wherein said pair of first ramp means comprise a plurality of first conveyor roller means disposed in substantially parallel relation to each other with their axes of rotation substantially parallel to said first and second side portions and a corresponding pair of first ramp frames, said first conveyor roller means being movably disposed on said first ramp frames for substantially simultaneous rotation about their longitudinal axes, whereby fruit will be transported toward said first and second side portions.

14. An agricultural machine as in claim 13 wherein each of said first conveyor roller means comprises a plurality of radially extending finger means disposed on the outer surface thereof, each of said finger means being in spaced apart relation to each other, whereby said finger means on adjacent ones of said first conveyor roller means will intermesh as they are rotated about their axes.

15. An agricultural machine as in claim 1 wherein said collection means further comprises a pair of second ramp means, one of said pair disposed in fruit receiving relation to a corresponding one of said first ramp means, each one of said pair of said second ramp means being disposed in substantially transverse relation to said one end of a corresponding one of said first ramp means.

16. An agricultural machine as in claim 15 wherein said pair of second ramp means comprise a plurality of second conveyor roller means disposed in substantially parallel relation to each other with their axes of rotation substantially transverse to said first ramp means, whereby fruit received from said first ramp means will be transported toward one end of said enclosure means.

17. An agricultural machine as in claim 16 wherein said fruit is transported toward the rear of said enclosure means, said rear being opposite the direction of travel of said agricultural machine.

18. An agricultural machine as in claim 1 wherein said collection means further comprises third ramp means comprising elevator ramp means disposed in fruit receiving relation to one of said pair of second ramp means adjacent said first side portion whereby fruit is raised to a predetermined height above said bottom; cross-over ramp means disposed in fruit receiving relation to the other of said second ramp means adjacent said second side portion whereby fruit is transported across the top of said enclosure means and delivered to the top of said elevator ramp means; and delivery ramp means disposed in fruit receiving relation to the junction of said elevator ramp means and said crossover ramp means.

19. An agricultural machine as in claim 18 wherein said collection means further comprises storage container means disposed in fruit receiving relation to fruit exiting said delivery ramp means.

20. An agricultural machine as in claim 1 wherein said bottom liner means and said first ramp means are pivotally attached to said first and second side portions, whereby said bottom liner means and said pair of first ramp means may be folded upwardly toward a corresponding one of said first and second side portions when transporting said agricultural machine along a roadway.

21. An agricultural machine as in claim 20 wherein each of said pair of first ramp means are movably attached to said corresponding first and second side portions so as to allow predetermined individual lateral movement of each of said pair with regard to said corresponding first and second side portions.

22. An agricultural machine as in claim 21 further comprising a plurality of shock absorber means disposed in interconnecting relation between said first ramp means and corresponding first and second side portions, said shock absorber means being fixedly attached at one end to said first ramp means and being pivotally attached at the other end to said corresponding first and second side portions.

* * * * *